United States Patent
Matsuo et al.

(10) Patent No.: US 7,800,517 B2
(45) Date of Patent: Sep. 21, 2010

(54) INFORMATION PROCESSING APPARATUS, INFORMATION PROCESSING METHOD, AND COMPUTER PROGRAM

(75) Inventors: Takashi Matsuo, Tokyo (JP); Shoji Mitsuhashi, Kanagawa (JP)

(73) Assignee: Sony Corporation, Tokyo (JP)

(*) Notice: Subject to any disclaimer, the term of this patent is extended or adjusted under 35 U.S.C. 154(b) by 36 days.

(21) Appl. No.: 12/369,382

(22) Filed: Feb. 11, 2009

(65) Prior Publication Data

US 2009/0256731 A1    Oct. 15, 2009

(30) Foreign Application Priority Data

Apr. 10, 2008   (JP) .............. 2008-102552

(51) Int. Cl.
*H03M 7/34* (2006.01)

(52) U.S. Cl. ............ 341/51; 375/240.16; 370/389

(58) Field of Classification Search .......... 341/50–90; 709/220, 224; 455/561, 553.1; 375/240.16; 370/325, 331, 445, 352, 389, 465, 470

See application file for complete search history.

(56) References Cited

U.S. PATENT DOCUMENTS

| | | | |
|---|---|---|---|
| 6,151,326 A * | 11/2000 | McGuire et al. | 370/402 |
| 6,678,329 B2 * | 1/2004 | Apostolopoulos | 375/240.16 |
| 7,383,982 B2 * | 6/2008 | Yamamoto et al. | 235/375 |
| 7,468,987 B1 * | 12/2008 | Bennett et al. | 370/465 |

FOREIGN PATENT DOCUMENTS

| | | |
|---|---|---|
| JP | 2000-353216 | 12/2000 |
| JP | 2002-269508 | 9/2002 |
| JP | 2004-264921 | 9/2004 |
| JP | 2006-72956 | 3/2006 |
| JP | 2006-99509 | 4/2006 |
| JP | 2007-235713 | 9/2007 |

* cited by examiner

*Primary Examiner*—Lam T Mai
(74) *Attorney, Agent, or Firm*—Oblon, Spivak, McClelland, Maier & Neustadt, L.L.P.

(57) ABSTRACT

An information processing apparatus includes: a data acquisition section inputting data; a data conversion section performing data conversion processing on the data input through the data acquisition section; and a control section performing data processing using the data converted by the conversion processing by the data conversion section, wherein when non-standard compliant data other than standard compliant data capable of being subjected to data processing by the control section is input from the data acquisition section, the data conversion section performs conversion processing of the non-standard compliant data into standard compliant data.

12 Claims, 7 Drawing Sheets

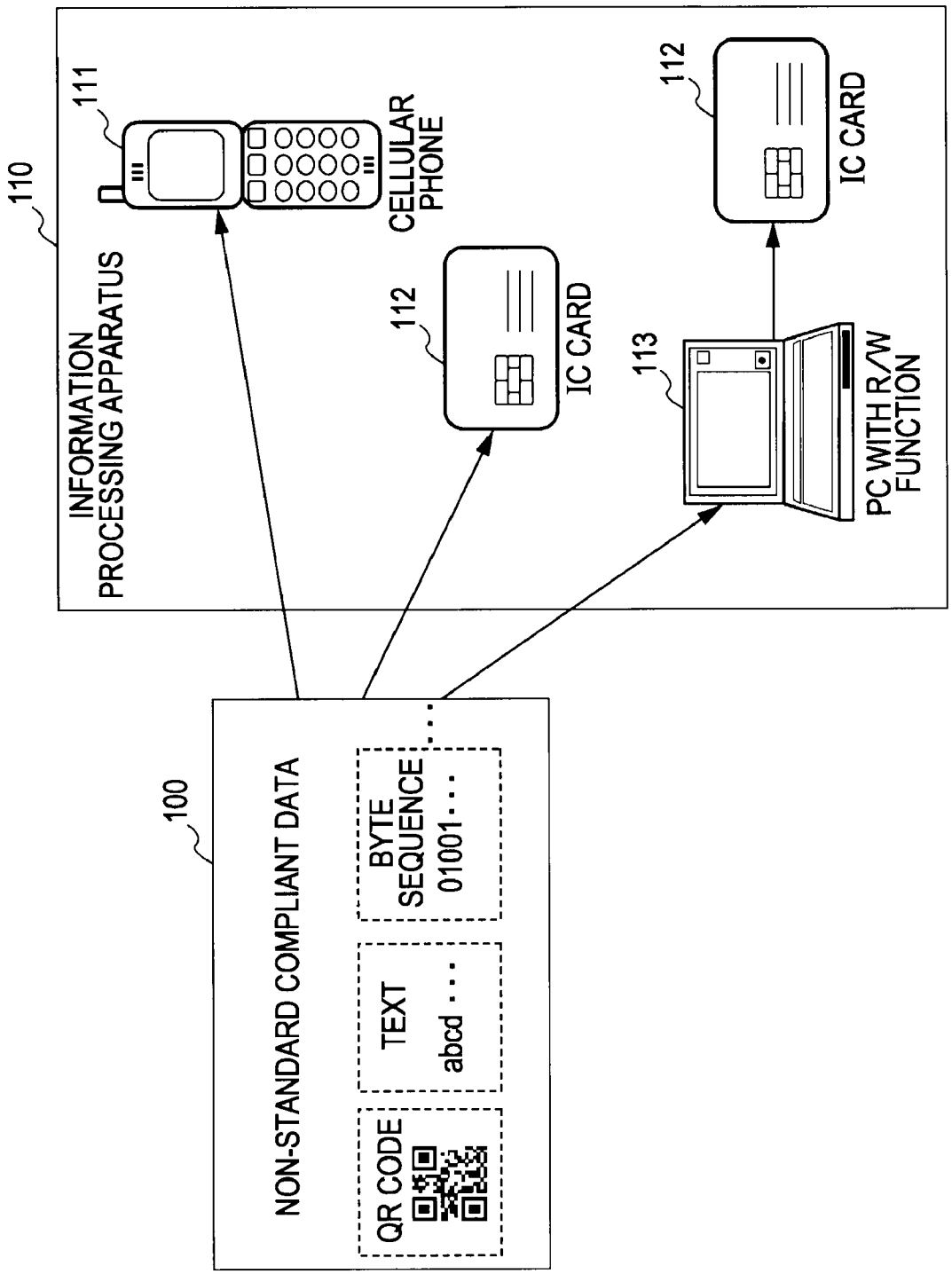

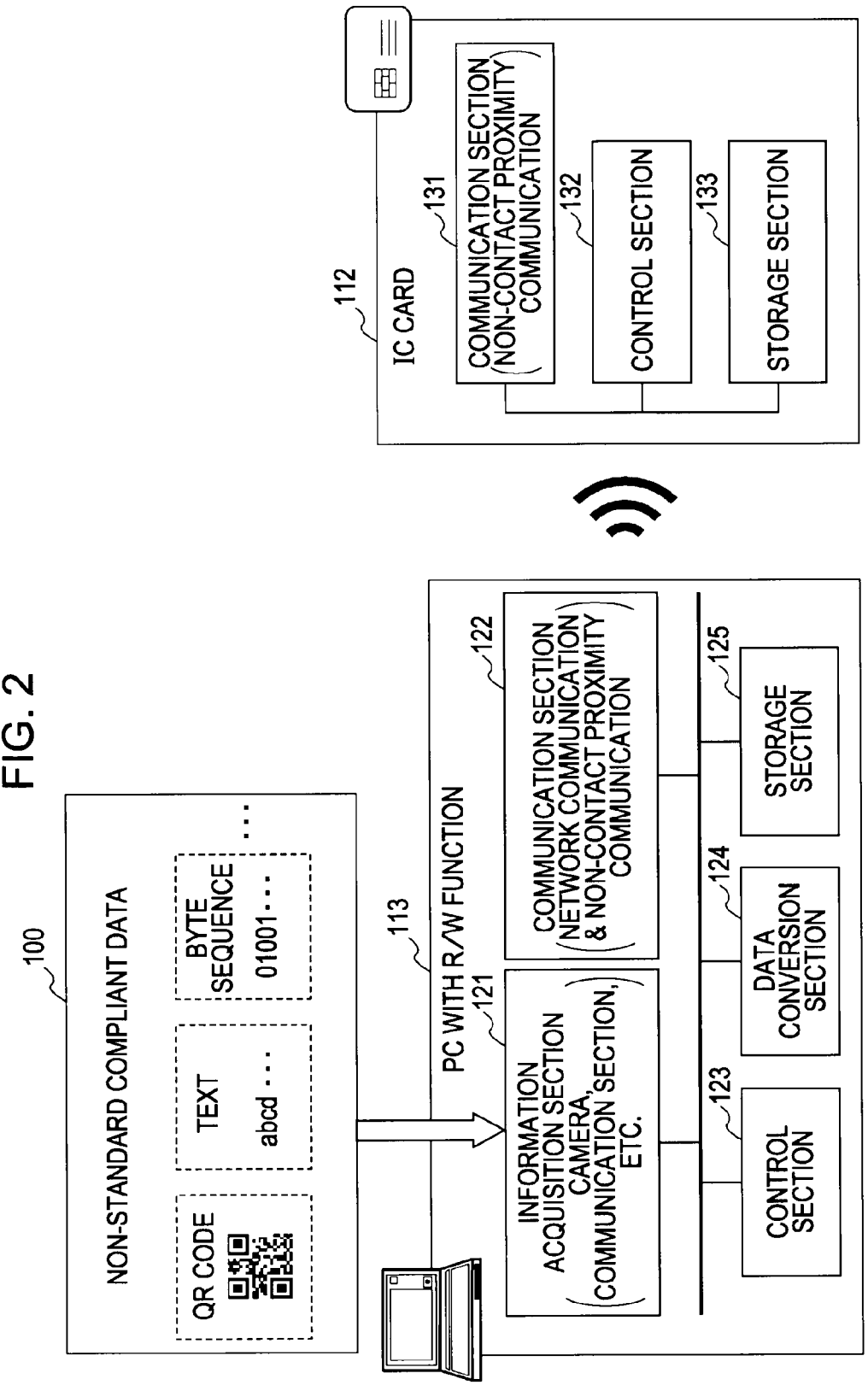

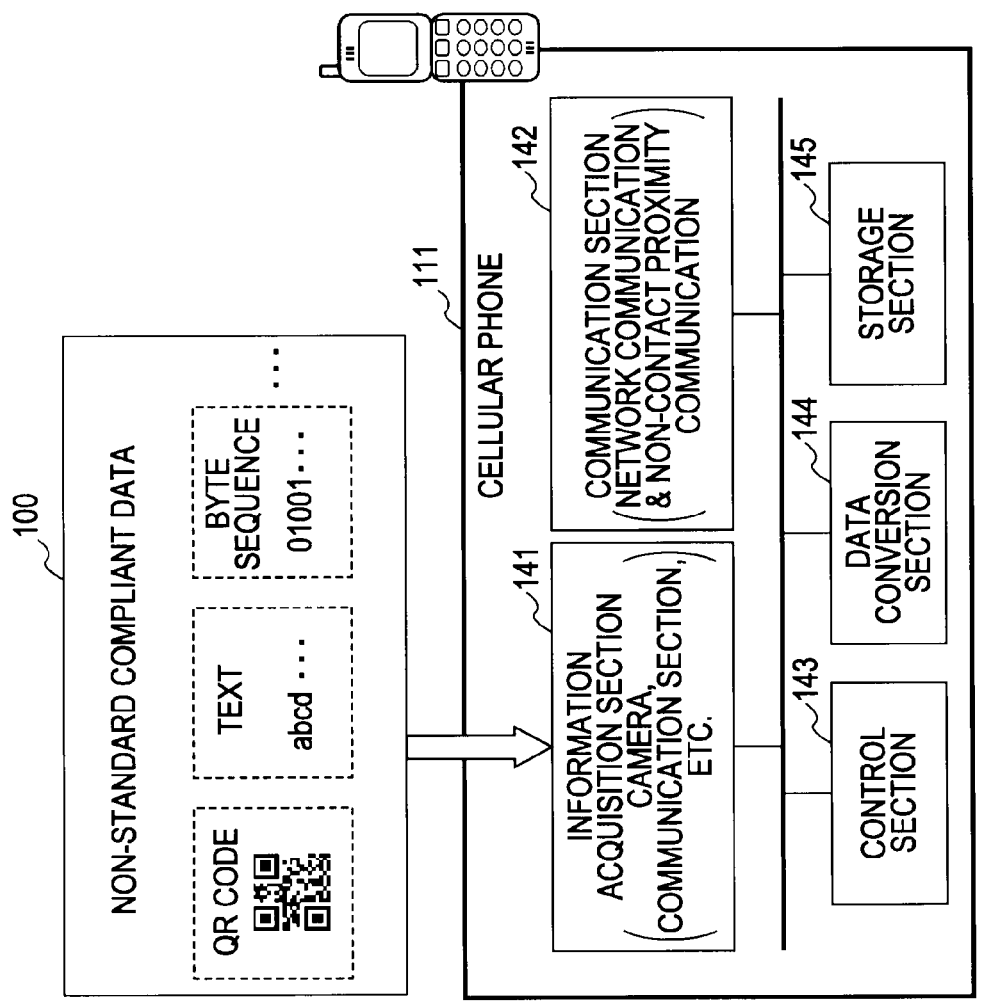

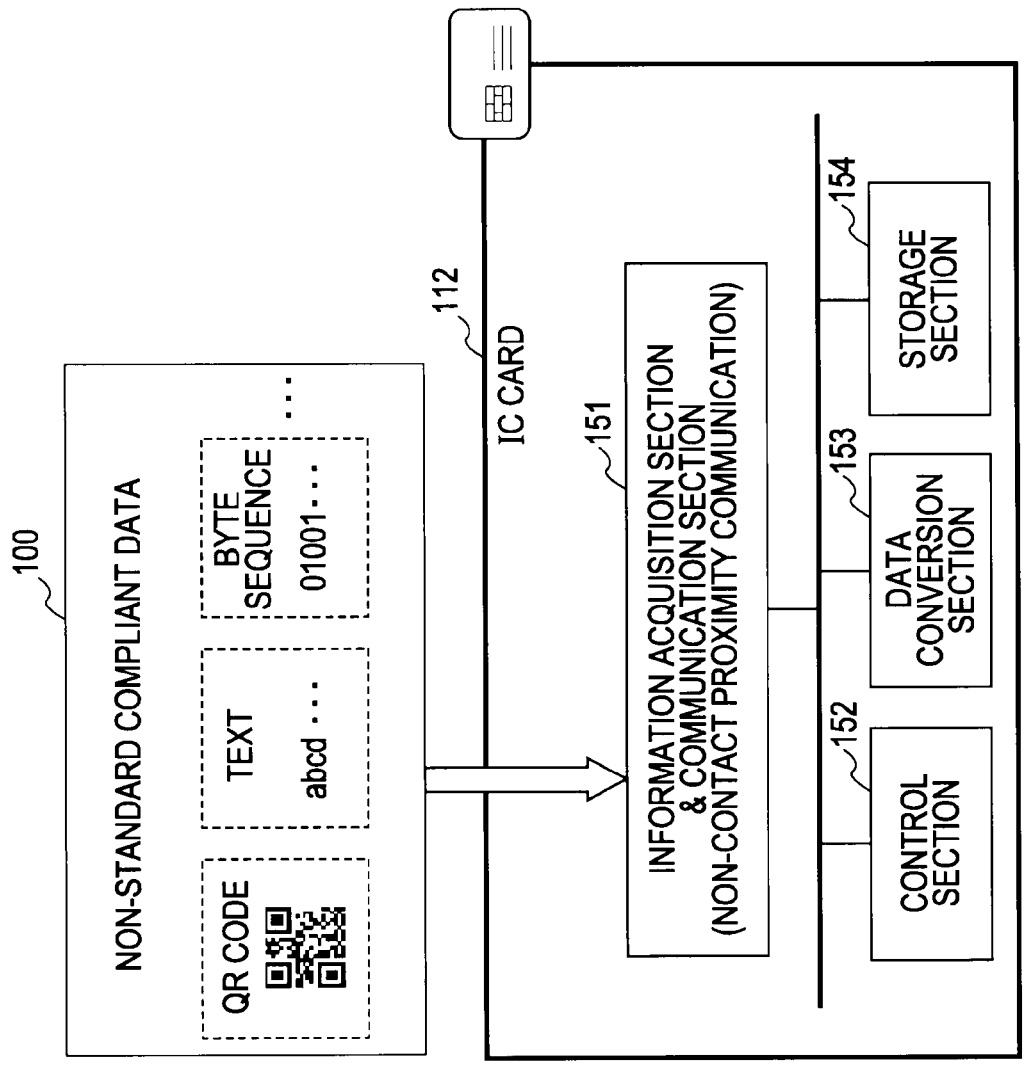

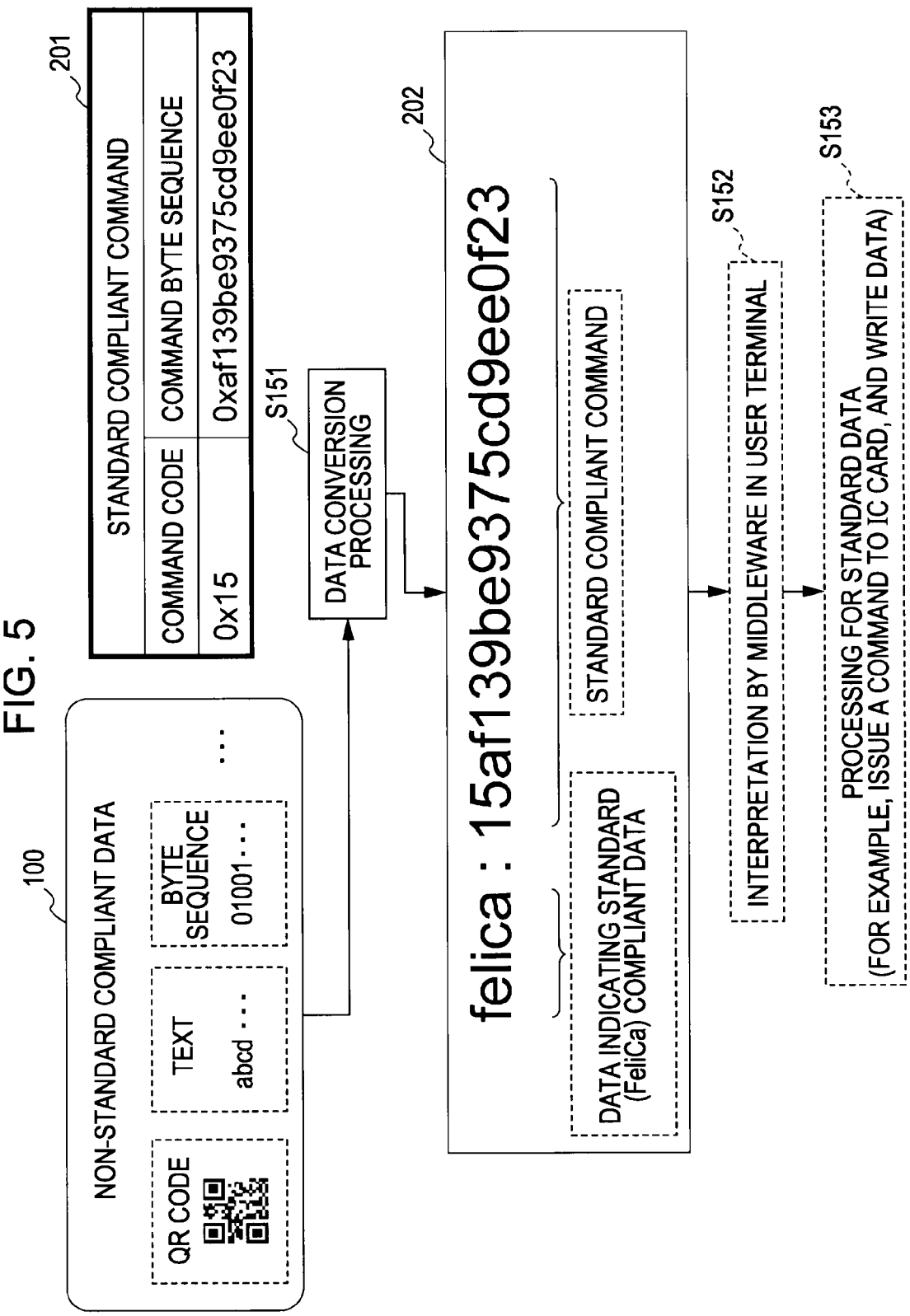

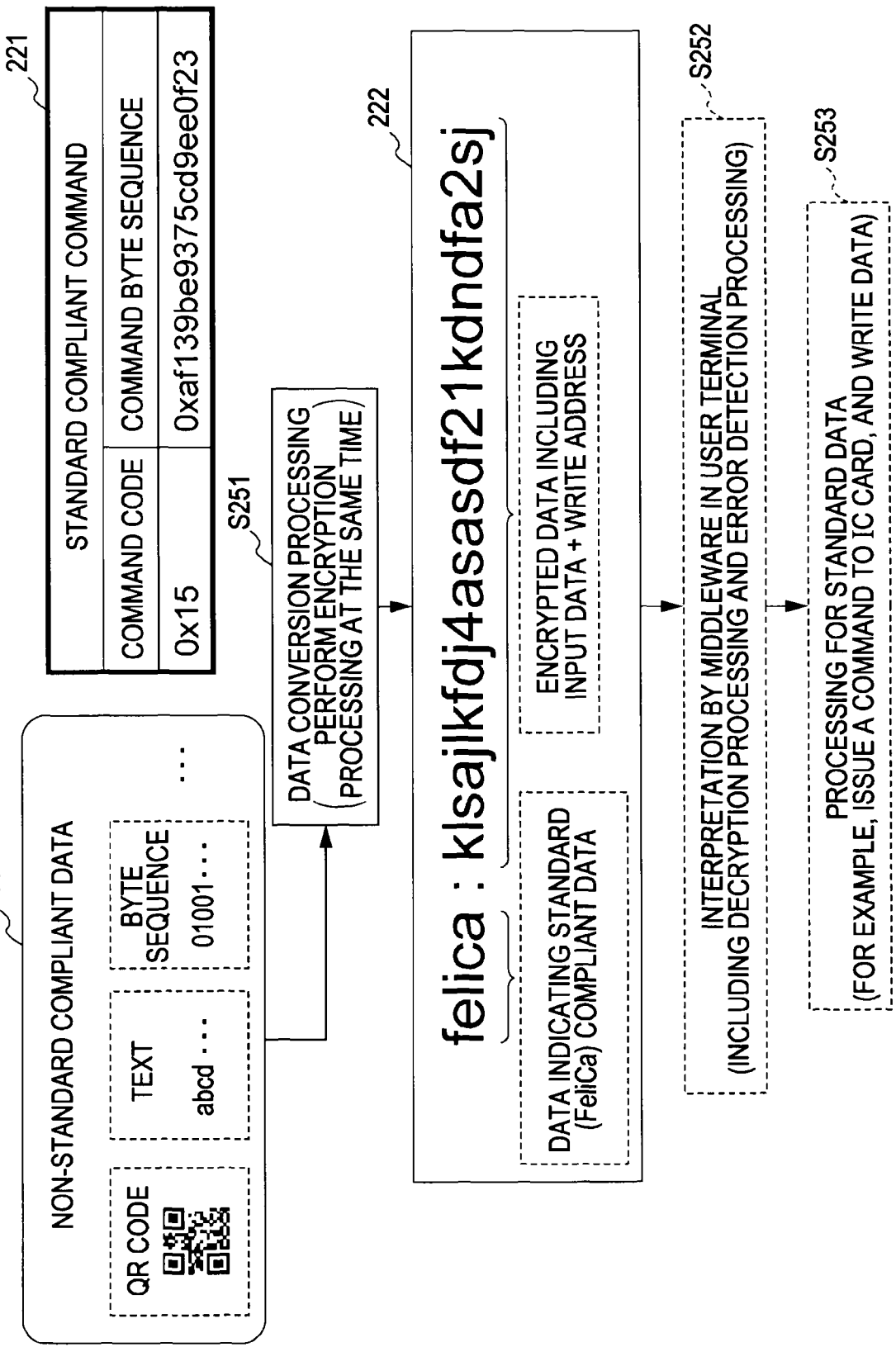

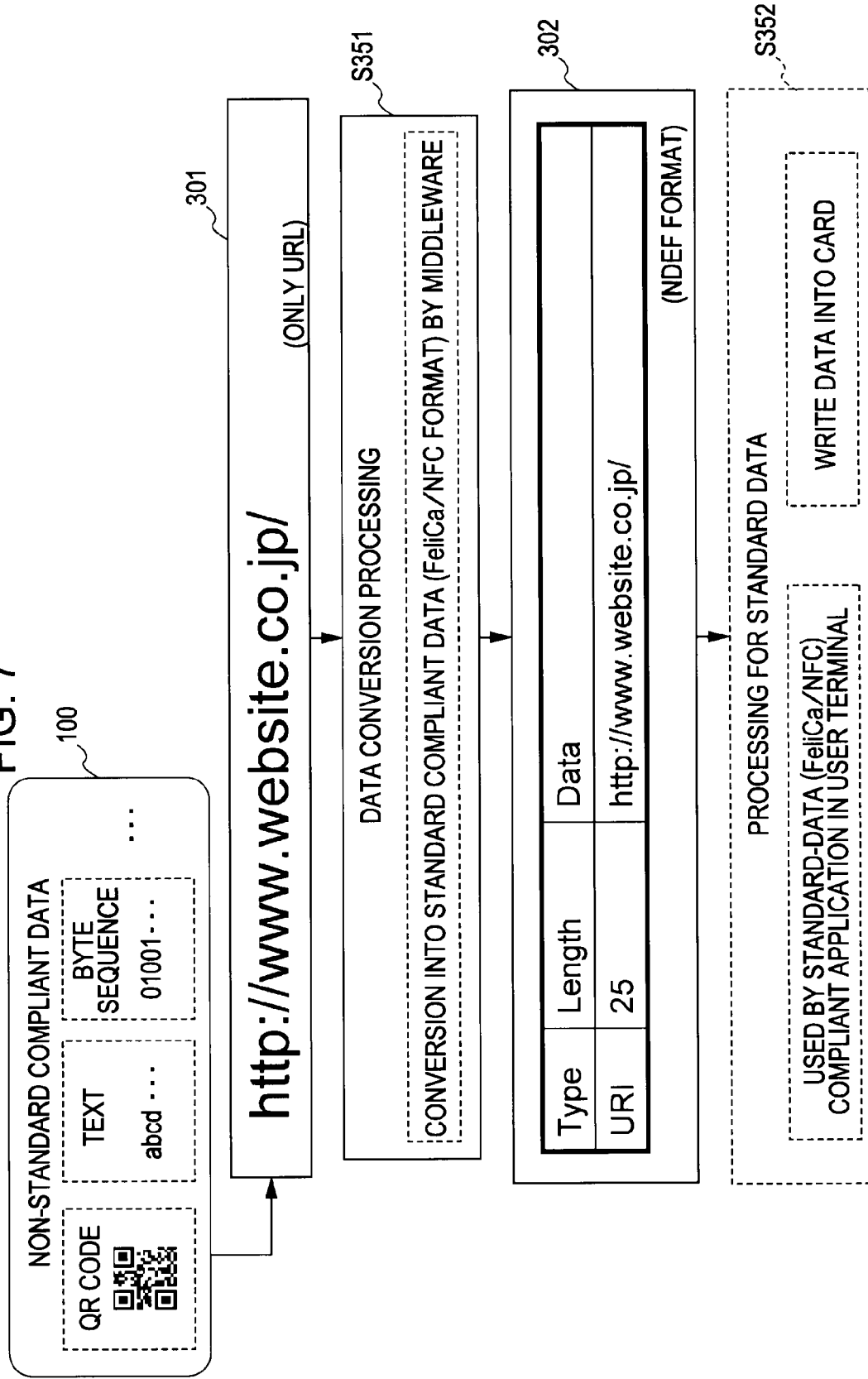

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2008-102552 filed in the Japanese Patent Office on Apr. 10, 2008, the entire contents of which are incorporated herein by reference.

BACKGROUND OF THE INVENTION

1. Field of the Invention

The present invention relates to an information processing apparatus, an information processing method, and a computer program. More particularly, the present invention relates to an information processing apparatus, an information processing method, and a computer program which allow the information processing apparatus for processing standard compliant data to perform processing on non-standard compliant data.

2. Description of the Related Art

In recent years, devices, such as an IC card, a cellular phone, etc., are often provided with a communication section capable of proximity communication and a storage section. These devices are used for an electronic money, etc., for example. When a user uses such a device, the user performs data communication, for example by touching or holding the device on or over an apparatus having a reader/writer (R/W) function. In this regard, for such a system, a description has been given, for example in Japanese Unexamined Patent Application Publication No. 2002-269508.

As an example of such a device, devices using FeliCa (registered trademark) have become familiar. FeliCa (registered trademark) are used for an IC card, a cellular phone, etc. However, there is a problem in that, in many cases, although an IC card or a cellular phone having a function of FeliCa (registered trademark) can perform data processing in compliance with a FeliCa standard, such a device is not allowed to perform processing on data which is not compliant with the FeliCa standard.

Specifically, devices using FeliCa are not allowed to interpret and process data which is not in compliance with the FeliCa (registered trademark) standard, for example, a QR code (two-dimensional bar code), text data, a bar code, etc. This is a common problem among devices complying with standards other than FeliCa (registered trademark). Those devices are allowed to process only data in compliance with individual specific standards, and are not allowed to process data in compliance with the other standards.

Accordingly, such standard compliant devices have a problem in that although the devices are allowed to perform data transmission/receiving and data processing with a server and a reader/writer (R/W), which perform input/output of data in compliance with the individual standards, but are not allowed to handle data other than the individual standard compliant data.

In recent years, such devices have been widely used in a variety of services. For example, in one service, a QR code is printed on magazines, etc, the QR code is photographed by a cellular phone, and the data recorded by that QR code is allowed to be used for coupons. In another service, service data is sent to a user device through an electronic mail, and then the service data is recorded into a memory to be allowed for use at stores. However, devices capable of processing only on standard compliant data as described above are not allowed to interpret and store a QR code, text data included in a mail, etc., into a memory, which are different from the individual standard compliant data. Thus, the devices are not allowed to use such a variety of services. In this manner, devices which are specific to processing of particular standard compliant data have a problem in that the devices are difficult to flexibly handle data, such as general text data, a bar code, a QR code, etc.

SUMMARY OF THE INVENTION

The present invention has been made in view of the above-described problems, for example. It is desirable to provide an information processing apparatus, an information processing method, and a computer program which are capable of processing, such as interpretation, recording, etc., on data, such as non-standard compliant text data, a QR code, etc., in a device performing a specific standard compliant data.

According to an embodiment of the present invention, there is provided an information processing apparatus including: a data acquisition section inputting data; a data conversion section performing data conversion processing on the data input through the data acquisition section; and a control section performing data processing using the data converted by the conversion processing by the data conversion section, wherein when non-standard compliant data other than standard compliant data capable of being subjected to data processing by the control section is input from the data acquisition section, the data conversion section performs conversion processing of the non-standard compliant data into standard compliant data.

Further, in an information processing apparatus according to an embodiment of the present invention, the data conversion section may generate data including a storage address of the standard compliant data converted from the non-standard compliant data by the data conversion processing.

Further, in an information processing apparatus according to an embodiment of the present invention, the data conversion section may further perform encryption processing in the data conversion processing, and the control section may perform decryption processing of the encrypted data obtained by the conversion processing and the encryption processing in the data conversion section and may perform data processing using the decrypted converted data.

Further, in an information processing apparatus according to an embodiment of the present invention, the conversion section may perform conversion processing on data indicating a URL (Uniform Resource Locator) having been input through the data acquisition section into standard compliant data indicating the URL. In this regard, a URL is only an example of data identifying a location of an information resource on a network. Not only a URL, but also a URI (Uniform Resource Identifier), which is different from the URL, but serves a same function, can be applied to the present invention.

Further, in an information processing apparatus according to an embodiment of the present invention, the data acquisition section may input a QR code or text data, and the data conversion section may perform data conversion processing on the QR code or the text data input through the data acquisition section into standard compliant data.

According to another embodiment of the present invention, there is provided a method of processing information in an information processing apparatus, the method including the steps of: acquiring data by a data acquisition section inputting data; converting data by a data conversion section converting data input through the data acquisition section; and controlling by a control section performing data processing using the data converted by the conversion processing in the data conversion section, wherein when non-standard compliant data other than standard compliant data capable of being subjected to data processing by the control section is input from the data acquisition section, the step of converting data performs data conversion of the non-standard compliant data into standard compliant data.

Further, in a method of processing information according to an embodiment of the present invention, the step of converting data may generate data including a storage address of the standard compliant data converted from the non-standard compliant data by the data conversion processing.

Further, in a method of processing information according an embodiment of to the present invention, the step of converting data may further perform encryption processing in the data conversion processing, and the step of controlling may perform decryption processing of the encrypted data obtained by the conversion processing and the encryption processing in the step of conversion data and may perform data processing using the decrypted converted data.

Further, in a method of processing information according an embodiment of to the present invention, the step of converting data may perform conversion processing on data indicating a URI having been input through the data acquisition section into standard compliant data indicating the URI.

Further, in a method of processing information according an embodiment of to the present invention, the step of acquiring data may input a QR code or text data, and the step of converting data may perform data conversion processing on the QR code or the text data input through the data acquisition section into standard compliant data.

Further, in a method of processing information according an embodiment of to the present invention, the data conversion processing in the step of converting data may be conversion processing into data in compliance with a FeliCa (a registered trademark) standard.

According to another embodiment of the present invention, there is provided a recording medium recording a computer readable program causing a computer to perform information processing including the steps of: acquiring data by a data acquisition section inputting data; converting data by a data conversion section converting data input through the data acquisition section; and controlling by a control section performing data processing using the data converted by the conversion processing in the data conversion section, wherein when non-standard compliant data other than standard compliant data capable of being subjected to data processing by the control section is input from the data acquisition section, the step of converting data performs data conversion of the non-standard compliant data into standard compliant data.

In this regard, a computer program according to an embodiment of the present invention is a computer program capable of being provided through a storage medium or a communication medium in a computer readable format, for example, to a general-purpose computer system performing various kinds of program code. By providing such a program in a computer readable format, the processing in accordance with the program is performed on a computer system.

Other and further objects, features and advantages of the present invention will become apparent by the detailed description based on the following embodiments of the present invention and the accompanying drawings. In this regard, in this specification, a system is a logical set of a plurality of apparatuses, and is not limited to a set of constituent apparatuses that are contained in a same casing.

By an embodiment of the present invention, the data acquisition section including a camera and a communication section inputs data, for example, a QR code, text data of a mail, etc., or the like. And the data conversion section performs data conversion processing on the data to produce standard compliant data, for example data in compliance with the FeliCa standard. Thus, it also becomes possible for an information processing apparatus to process non-standard compliant data in the same manner as standard compliant data, for example data output, data storage processing, and the other standard-compliant applications, and the like.

BRIEF DESCRIPTION OF THE DRAWINGS

FIG. 1 is a diagram illustrating an example of an information processing apparatus according to an embodiment of the present invention and an overview of processing;

FIG. 2 is a diagram illustrating an example of a PC and an IC card of an information processing apparatus according to an embodiment of the present invention and an overview of processing;

FIG. 3 is a diagram illustrating an example of a cellular phone of an information processing apparatus according to an embodiment of the present invention and an overview of processing;

FIG. 4 is a diagram illustrating an example of an IC card of an information processing apparatus according to an embodiment of the present invention and an overview of processing;

FIG. 5 is a diagram illustrating a specific example of data conversion processing of a data conversion section of an information processing apparatus according to an embodiment of the present invention;

FIG. 6 is a diagram illustrating a specific example of data conversion processing of a data conversion section of an information processing apparatus according to an embodiment of the present invention; and FIG. 7 is a diagram illustrating a specific example of data conversion processing of a data conversion section of an information processing apparatus according to an embodiment of the present invention.

DESCRIPTION OF THE PREFERRED EMBODIMENTS

In the following, detailed descriptions will be given of an information processing apparatus, an information processing method, and a computer program according to embodiments of the present invention with reference to the drawings.

First, a description will be given of an overview of processing and a configuration according to an embodiment of the present invention with reference to FIG. 1. FIG. 1 illustrates an example of an information processing apparatus according to an embodiment of the present invention. As shown in FIG. 1, an information processing apparatus 110 according to the embodiment of the present invention includes, for example, a cellular phone 111, an IC card 112, a PC 113, etc. These devices are standard-compliant apparatuses which perform processing of standard compliant data, such as data in compliance with "FeliCa (registered trademark)", for example. The PC 113 includes a reader/writer (R/W) section performing proximity communication with the IC card 112.

The information processing apparatus 110 (a cellular phone 111, an IC card 112, a PC 113, etc.) according to the embodiment of the present invention is not only allowed to process predetermined standard compliant data, but also to process data which is not compliant with the standard, such as a QR code, text data, etc. In this regard, the data which is not compliant with the standard is called non-standard compliant data in the following. The information processing apparatus 110 inputs non-standard compliant data 100 as shown in FIG. 1, and performs processing, such as data interpretation, data storage, etc., of the non-standard compliant data 100 in the same manner as the standard compliant data. Specifically, the information processing apparatus 110 performs data conversion of the non-standard compliant data 100 to generate the same data as the standard compliant data.

The non-standard compliant data 100 include a QR code printed on a magazine, etc., text data input through an information processing apparatus of a network and a reader/writer (R/W), or the like, and the other various kinds of byte sequence data, etc.

The information processing apparatus 110 according to the embodiment of the present invention inputs the non-standard compliant data 100 through an information acquisition section including a camera, a communication section, etc., performs the conversion processing of the input data, and performs the same processing as that of the standard compliant data. In this regard, in the embodiment described below, a description will be given of the embodiment on the assumption that the standard compliant data is FeliCa (registered trademark) compliant data. However, the present invention can be applied to an apparatus for processing standard compliant data other than the FeliCa (registered trademark) compliant data. By performing processing according to an embodiment of the present invention, it is possible for an information processing apparatus to process non-standard compliant data, which is other than the standard compliant data.

FIG. 2 illustrates an example of a specific configuration of the PC 113 and the IC card 112 in the information processing apparatus 110 shown in FIG. 1. As shown in FIG. 2, the PC 113 has an information acquisition section 121 including a camera obtaining the non-standard compliant data 100, a communication section, etc., a communication section 122 performing proximity communication (for example, proximity communication in accordance with the NFC (Near Field Communication) standard) with the IC card 112, etc., and communication through a network, a control section 123 performing various kinds of data processing and data communication control, a data conversion section 124 performing standard-compliant-data generation processing by the conversion processing of the non-standard compliant data input from the information acquisition section 121, and a storage section 125 storing various kinds of data, processing programs, etc. Standard-compliant command information, applications, etc., are recorded in the storage section 125. The standard-compliant commands and applications are executed by the control section 123.

The IC card 112 has a communication section 131 performing proximity communication (for example, proximity communication in accordance with the NFC standard) with the PC 113, etc., a control section 132 performing various kinds of data processing and data communication control, and a storage section 133 storing data input through the communication section 131 and processing programs.

In the configuration shown in FIG. 2, the PC 113 inputs the non-standard compliant data 100, such as a QR code, text data, the other various kinds of byte sequence data, etc., which are not FeliCa (registered trademark) compliant data, through the information acquisition section 121 including a camera, a communication section, etc. The non-standard compliant data 100 input from the information acquisition section 121 is input into the data conversion section 124, and is subjected to data conversion by the data conversion section 124.

A detailed description will be later given of the data conversion processing in the data conversion section 124. By the data conversion processing in the data conversion section 124, the non-standard compliant data 100 input from the information acquisition section 121 comes to have the same data structure as that of the FeliCa (registered trademark) compliant data. In the subsequent processing, it becomes possible to perform the same processing as that of the FeliCa (registered trademark) compliant data. That is to say, after the data conversion, it becomes possible for the non-standard compliant data 100 to be subjected to the recording processing into the storage section 125, and further data output processing through the communication section 122 in the same manner as the standard compliant data. Such data processing is performed by standard-compliant applications executed under the control of the control section 123, for example.

In the example shown in FIG. 2, it becomes possible for the IC card 112 to input the non-standard compliant data 100 input by the PC 113 as the FeliCa (registered trademark) compliant data, and to record the data as the FeliCa (registered trademark) compliant data through the conversion processing in the PC 113.

FIG. 3 illustrates an example of a configuration of the cellular phone 111 in the information processing apparatus 110 shown in FIG. 1. As shown in FIG. 3, the cellular phone 111 has an information acquisition section 141 including a camera obtaining non-standard compliant data 100, a communication section, etc., a communication section 142 performing proximity communication (for example, proximity communication in accordance with the NFC) with an IC card, a reader/writer (R/W) section of a PC, etc., and communication through a network, a control section 143 performing various kinds of data processing, and data communication control, a data conversion section 144 performing standard-compliant-data generation processing by conversion processing on non-standard compliant data input from the information acquisition section 141, and a storage section 145 storing various kinds of data, processing programs, etc. The storage section 145 stores standard-compliant command information, applications, etc., and the control section 143 performs the standard-compliant commands and the applications.

In the configuration shown in FIG. 3, the cellular phone 111 inputs the non-standard compliant data 100, such as a QR code, text data, the other various kinds of byte sequence data, etc., which are not FeliCa (registered trademark) compliant data, from the information acquisition section 141 including a camera, a communication section, etc. The non-standard compliant data 100 which has been input from the information acquisition section 141 is input into the data conversion section 144, and is subjected to data conversion by the data conversion section 144.

By the data conversion processing in the data conversion section 144, the non-standard compliant data 100 which has been input from the information acquisition section 141 comes to have the same data structure as that of the FeliCa (registered trademark) compliant data. Thus, in the subsequent processing, it becomes possible for the information processing apparatus to perform the same processing as that of the FeliCa (registered trademark) compliant data. That is to say, after the data conversion, it becomes possible for the non-standard compliant data 100 to be subjected to the recording processing into the storage section 145, and further data output processing through the communication section 142 in the same manner as the standard compliant data. Such data processing is performed by standard-compliant applications executed under the control of the control section 143, for example.

FIG. 4 illustrates an example of a configuration corresponding to an example of the IC card 112 in the information processing apparatus 110 shown in FIG. 1. As shown in FIG. 4, the IC card 112 has an information acquisition section & communication section 151 performing proximity communication (for example, proximity communication in accordance with the NFC standard), a control section 152 performing various kinds of data processing, and data communication control, a data conversion section 153 performing standard-compliant-data generation processing by conversion processing on non-standard compliant data input from the information acquisition section 151, and a storage section 154 storing various kinds of data, processing programs, etc. The storage section 154 stores standard-compliant command information, applications, etc., and the standard-compliant commands, and the applications are performed in the control section 152.

In the configuration shown in FIG. 4, the IC card 112 inputs the non-standard compliant data 100, such as a QR code, text data, the other various kinds of byte sequence data, etc., which are not FeliCa (registered trademark) compliant data, from the information acquisition section & communication section 151 performing proximity communication (for example, proximity communication in accordance with the NFC standard). The non-standard compliant data 100 which has been input from the information acquisition section & communication section 151 is input into the data conversion section 153, and is subjected to data conversion by the data conversion section 153.

By the data conversion processing in the data conversion section 153, the non-standard compliant data 100 input from the information acquisition section & communication section 151 comes to have the same data structure as that of the FeliCa (registered trademark) compliant data. Thus, in the subsequent processing, it becomes possible for the information processing apparatus to perform the same processing as that of the FeliCa (registered trademark) compliant data. That is to say, after the data conversion, it becomes possible for the non-standard compliant data 100 to be subjected to the recording processing into the storage section 154, and further data output processing through the information acquisition section & communication section 151 in the same manner as the standard compliant data. Such data processing is performed by standard-compliant applications executed under the control of the control section 152, for example.

Next, a detailed description will be given of data conversion processing performed in the data conversion section in the information processing apparatus 110 with reference to FIG. 5. As described above, the data conversion section in the information processing apparatus 110 generates standard compliant data by the data conversion of the non-standard compliant data. Specifically, for example, if standard compliant data is the FeliCa (registered trademark) compliant data, when a QR code, text data, the other various kinds of byte sequence data, etc., which are not the FeliCa (registered trademark) compliant data, are input, conversion processing into the FeliCa (registered trademark) compliant data is performed.

FIG. 5 shows an example in which the data conversion processing is performed on non-standard-compliant data to produce data which can be subjected to the same data processing as the FeliCa (registered trademark) compliant data.

The input data is the non-standard compliant data 100, such as a QR code, text data, the other various kinds of byte sequence data, etc. Step S151 is a data-conversion processing step which is performed by the data conversion section in the information processing apparatus. In step S151, the conversion processing is performed on the input non-standard compliant data 100 to generate standard compliant data 202.

The standard compliant data 202 shown in FIG. 5 is standard compliant data generated by the conversion of the input data. The standard compliant data 202 includes data indicating that the data is standard (FeliCa)-compliant, "FeliCa", and a standard compliant data string generated by the conversion of information included in the non-standard compliant data and address information indicating a storage address of the data, "15af to 0f23". This data includes, for example data, such as a coupon code included in the non-standard compliant data 100. In this regard, the data conversion section may generate error-detection data and may perform additional processing at the same time. In this case, the standard compliant data 202 shown in FIG. 5 includes error-detection data.

In this regard, the address information may be recorded in the non-standard compliant data 100 in advance, and the data thereof may be used. Alternatively, the address information may be generated and set by the data conversion section of the information processing apparatus at the time of data conversion processing.

Data 201 shown in FIG. 5 illustrates command data, namely, an example of the FeliCa (registered trademark) compliant data, which is the standard compliant data in this example. By the data conversion processing in the data conversion section of the information processing apparatus, the non-standard compliant data 100 which has been input from the information acquisition section is converted into the same standard compliant data (command) as the command 201.

The data after the conversion is interpreted by the middleware in the information processing apparatus in step S152, and is subjected to the same processing as that of the standard compliant data in step S153. In this regard, if an error-detection code is set in the standard compliant data 202 generated by the conversion processing, error detection processing is performed at the time of the interpretation processing in step S152.

In processing of step S153, for example, if the information processing apparatus that has performed the data conversion processing is the PC 113 shown in FIG. 2, the following processing is performed. For example, output processing of the standard compliant data 202 generated by the conversion processing to the IC card 112, and storage processing of the standard compliant data 202 into the storage section 125 of the PC 113 in accordance with the address included in the standard compliant data 202 generated by the conversion processing.

Next, with reference to FIG. 6, a description will be given of an example of processing in which encryption processing is additionally performed at the time of the data conversion processing on the non-standard compliant data. In the same manner as the example described with reference to FIG. 5, the input data is the non-standard compliant data 100, such as a QR code, text data, the other various kinds of byte sequence data, etc. In step S251, the data conversion section in the information processing apparatus performs the conversion processing on the input non-standard compliant data 100 to generate standard compliant data 222.

In this example, data encryption processing is additionally performed at the time of the data conversion processing in step S251. Also, generation of error-detection data and additional processing may be performed in the same manner as the processing described with reference to FIG. 5.

The standard compliant data 222 shown in FIG. 6 includes data indicating that the data is standard (FeliCa)-compliant, "FeliCa", and standard compliant data generated by the conversion and the encryption processing of input data, and address information indicating a storage address of the data, "k1sa to a2sj". This data includes, for example data, such as a coupon code included in the non-standard compliant data 100, and the data produced by encrypting the data obtained from the information acquisition section.

In this regard, in the same manner as the processing example described with reference to FIG. 5, the address information may be set by reading recorded data in the non-standard compliant data 100. Alternatively, the address information may be generated by the data conversion section of the information processing apparatus at the time of data conversion processing, and set as constituent data of the standard compliant data 222.

Data 221 shown in FIG. 6 illustrates command data, an example of the FeliCa (registered trademark) compliant data, which is the standard compliant data in this example. By the data conversion processing in the data conversion section of the information processing apparatus, the non-standard compliant data 100 which has been input from the information acquisition section is generated as the encrypted data of the same standard compliant data (command) as the command 201.

The data after the conversion is subjected to decryption processing and error-detection processing using an error detection code by middleware in the information processing apparatus in step S252, and then is subjected to data interpretation. In step S253, the data is subjected to the same processing as that of standard compliant data. For example, if the information processing apparatus that has performed the data conversion processing is the PC 113 shown in FIG. 2, the following processing is performed: for example, output processing of the standard compliant data 202 generated by the conversion processing to the IC card 112, and storage processing of the standard compliant data 202 into the storage section 125 of the PC 113 in accordance with the address included in the standard compliant data 202 generated by the conversion processing.

Next, with reference to FIG. 7, a description will be given of an example of processing when the non-standard compliant data input by the information acquisition section is a URL or a URI. In the same manner as the examples described with reference to FIGS. 5 and 6, input data is the non-standard compliant data 100, such as a QR code, text data, the other various kinds of byte sequence data, etc. The entity of the data is assumed to be a URL or a URI as access information to a Web site, etc., that is to say, URL data 301 shown in FIG. 7.

In this case, in step S351, the data conversion section of the information processing apparatus performs, for example, conversion processing on the input URL data 301 as the middleware processing to generate standard compliant data 302. In this example, the data conversion section generates NDEF format data, which is the standard (FeliCa)-compliant data. As shown in FIG. 7, this data has a structure including a data type, a length, and entity data (URL).

The data after the conversion is subjected to processing as the standard compliant data in the information processing apparatus in step S352. For example, the following processing is performed: Web-site access processing by a standard-compliant application using the standard compliant data 302 generated by the conversion processing, storage processing in the storage section, data output processing to an external IC card 112, and the like.

The present invention has been explained in detail by referring to the specific embodiments. However, it is obvious that those skilled in the art can perform modifications and substitutions on the embodiments without departing from the spirit of the present invention. That is to say, the present invention has been disclosed in a form of an example, and should not be limitedly interpreted. In order to determine the gist of the present invention, the appended claims should be taken into account.

Also, the series of processing described in the specification can be executed by hardware or by software or by the combination of both of these. When the processing is executed by software, the programs recording the processing sequence may be installed in a memory of a computer built in dedicated hardware. Alternatively, the various programs may be installed and executed in a general-purpose computer capable of executing various processing. For example, the programs may be recorded in a recording medium in advance. In addition to installation from a recording medium to a computer, the programs may be received through a network, such as a LAN (Local Area Network) and the Internet, and may be installed in a recording medium, such as an internal hard disk, etc.

In this regard, the various processing described in this specification may be executed not only in time series in accordance with the description, but also may be executed in parallel or individually in accordance with the processing ability of the apparatus executing the processing or as necessary. Also, a system in this specification is a logical set of a plurality of apparatuses, and is not limited to a set of constituent apparatuses that are contained in a same casing.

What is claimed is:

1. An information processing apparatus comprising:
a data acquisition section inputting data;
a data conversion section performing data conversion processing on the data input through the data acquisition section; and
a control section performing data processing using the data converted by the conversion processing by the data conversion section,
wherein when non-standard compliant data other than standard compliant data capable of being subjected to data processing by the control section is input from the data acquisition section, the data conversion section performs conversion processing of the non-standard compliant data into standard compliant data.

2. The information processing apparatus according to claim 1,
wherein the data conversion section generates data including a storage address of the standard compliant data converted from the non-standard compliant data by the data conversion processing.

3. The information processing apparatus according to claim 1,
wherein the data conversion section further performs encryption processing in the data conversion processing, and the control section performs decryption processing of the encrypted data obtained by the conversion processing and the encryption processing in the data conversion section and performs data processing using the decrypted converted data.

4. The information processing apparatus according to claim 1,
wherein the conversion section performs conversion processing on data indicating a URI having been input through the data acquisition section into standard compliant data indicating the URI.

5. The information processing apparatus according to claim 1,
wherein the data acquisition section inputs a QR code or text data, and
the data conversion section performs data conversion processing on the QR code or the text data input through the data acquisition section into standard compliant data.

6. A method of processing information in an information processing apparatus, the method comprising the steps of:
acquiring data by a data acquisition section inputting data;
converting data by a data conversion section converting data input through the data acquisition section; and
controlling by a control section performing data processing using the data converted by the conversion processing in the data conversion section,
wherein when non-standard compliant data other than standard compliant data capable of being subjected to data processing by the control section is input from the data acquisition section, the step of converting data performs data conversion of the non-standard compliant data into standard compliant data.

7. The method of processing information according to claim 6,
wherein the step of converting data generates data including a storage address of the standard compliant data converted from the non-standard compliant data in the data conversion processing.

8. The method of processing information according to claim 6,
wherein the step of converting data further performs encryption processing in the data conversion processing, and the step of controlling performs decryption processing of the encrypted data obtained by the conversion processing and the encryption processing in the step of converting data and performs data processing using the decrypted converted data.

9. The method of processing information according to claim 6,
wherein the step of converting data performs conversion processing on data indicating a URI having been input through the data acquisition section into standard compliant data indicating the URI.

10. The method of processing information according to claim 6,
wherein the step of acquiring data inputs a QR code or text data, and
the step of converting data performs data conversion processing on the QR code or the text data input through the data acquisition section into standard compliant data.

11. The method of processing information according to claim 6,
wherein the data conversion processing in the step of converting data is conversion processing into data in compliance with a FeliCa (a registered trademark) standard.

12. A recording medium recording a computer readable program causing a computer to perform information processing comprising the steps of:
acquiring data by a data acquisition section inputting data;
converting data by a data conversion section converting data input through the data acquisition section; and
controlling by a control section performing data processing using the data converted by the conversion processing in the data conversion section,
wherein when non-standard compliant data other than standard compliant data capable of being subjected to data processing by the control section is input from the data acquisition section, the step of converting data performs data conversion of the non-standard compliant data into standard compliant data.

* * * * *